US012004142B2

(12) United States Patent
Venugopal et al.

(10) Patent No.: US 12,004,142 B2
(45) Date of Patent: Jun. 4, 2024

(54) UPLINK TIMING ASSOCIATED WITH UPLINK TRANSMISSION CONFIGURATION INDICATION (TCI) STATE

(71) Applicant: QUALCOMM Incorporated, San Diego, CA (US)

(72) Inventors: Kiran Venugopal, Raritan, NJ (US); Wooseok Nam, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 17/189,049

(22) Filed: Mar. 1, 2021

(65) Prior Publication Data

US 2021/0306994 A1 Sep. 30, 2021

Related U.S. Application Data

(60) Provisional application No. 63/002,238, filed on Mar. 30, 2020.

(51) Int. Cl.
*H04W 72/044* (2023.01)
*H04W 72/0446* (2023.01)
(Continued)

(52) U.S. Cl.
CPC ..... *H04W 72/046* (2013.01); *H04W 72/0446* (2013.01); *H04W 72/23* (2023.01); *H04W 72/56* (2023.01)

(58) Field of Classification Search
CPC ............. H04W 72/046; H04W 72/042; H04W 72/0446; H04W 72/14; H04W 72/10; H04W 56/0045
See application file for complete search history.

(56) References Cited

U.S. PATENT DOCUMENTS

| 10,979,128 B1* | 4/2021 | Babaei ................ H04W 52/36 |
| 2008/0199180 A1* | 8/2008 | Yang ................... H04L 12/4666 |
| | | 398/58 |

(Continued)

FOREIGN PATENT DOCUMENTS

| CN | 110366264 A * 10/2019 ............ H04W 74/08 |
| EP | 3713140 A1 9/2020 |

(Continued)

OTHER PUBLICATIONS

CATT: "Consideration on Multi-Beam Enhancements", 3GPP TSG RAN WG1 Meeting #98, R1-1908603, 3rd Generation Partnership Project (3GPP), Prague, CZ; Aug. 26, 2019-Aug. 30, 2019, Aug. 26-30, 2019, XP051765211, 7 Pages, Retrieved from the Internet: URL: http://www.3gpp.org/ftp/tsg_ran/WG1_RL1/TSGR1_98/Docs/R1-1908603.zip [retrieved on Aug. 17, 2019].

(Continued)

*Primary Examiner* — Jael M Ulysse
(74) *Attorney, Agent, or Firm* — QUALCOMM Incorporated

(57) ABSTRACT

A method of wireless communication by a UE (user equipment) includes setting a timing parameter based on an uplink TCI (transmission configuration indication) state. The method also includes adjusting uplink transmit timing for an uplink transmission based on the timing parameter.

28 Claims, 5 Drawing Sheets

(51) Int. Cl.
*H04W 72/23* (2023.01)
*H04W 72/56* (2023.01)

(56) References Cited

U.S. PATENT DOCUMENTS

| | | | | |
|---|---|---|---|---|
| 2013/0051339 | A1* | 2/2013 | Yang | H04W 72/0453 |
| | | | | 370/329 |
| 2016/0309467 | A1* | 10/2016 | Yerramalli | H04W 72/0446 |
| 2016/0353507 | A1* | 12/2016 | Uemura | H04W 76/15 |
| 2017/0325225 | A1* | 11/2017 | Dinan | H04W 72/0446 |
| 2019/0253949 | A1* | 8/2019 | Park | H04W 36/14 |
| 2019/0261281 | A1* | 8/2019 | Jung | H04W 52/50 |
| 2019/0281587 | A1* | 9/2019 | Zhang | H04W 72/23 |
| 2019/0296805 | A1* | 9/2019 | Son | H04W 76/27 |
| 2019/0297637 | A1* | 9/2019 | Liou | H04W 72/1273 |
| 2019/0342907 | A1* | 11/2019 | Huang | H04W 72/23 |
| 2019/0349061 | A1* | 11/2019 | Cirik | H04L 1/1861 |
| 2019/0387547 | A1 | 12/2019 | Shin et al. | |
| 2019/0394082 | A1* | 12/2019 | Cirik | H04W 76/28 |
| 2020/0052769 | A1* | 2/2020 | Cirik | H04L 1/0026 |
| 2020/0092814 | A1* | 3/2020 | Zhou | H04W 52/0235 |
| 2020/0100201 | A1* | 3/2020 | Farmanbar | H04W 56/0005 |
| 2020/0120584 | A1* | 4/2020 | Yi | H04L 5/0048 |
| 2020/0146059 | A1* | 5/2020 | Cirik | H04L 5/001 |
| 2020/0260428 | A1* | 8/2020 | Xu | H04W 76/27 |
| 2020/0260445 | A1* | 8/2020 | Jeong | H04L 5/0098 |
| 2020/0267712 | A1* | 8/2020 | Cirik | H04W 72/23 |
| 2020/0351129 | A1* | 11/2020 | Kwak | H04L 5/0053 |
| 2020/0351794 | A1* | 11/2020 | Xu | H04B 7/0874 |
| 2020/0351892 | A1* | 11/2020 | Yi | H04L 5/0092 |
| 2021/0120581 | A1* | 4/2021 | Kim | H04W 76/27 |
| 2021/0120592 | A1* | 4/2021 | Takahashi | H04W 48/12 |
| 2021/0153193 | A1* | 5/2021 | Lin | H04W 56/0065 |
| 2021/0159967 | A1* | 5/2021 | Cirik | H04L 5/001 |
| 2021/0168858 | A1* | 6/2021 | Liu | H04L 27/26 |
| 2021/0184812 | A1* | 6/2021 | MolavianJazi | H04L 1/0041 |
| 2021/0258057 | A1* | 8/2021 | Kim | H04B 17/318 |
| 2021/0274538 | A1* | 9/2021 | Liu | H04L 5/0098 |
| 2021/0282182 | A1* | 9/2021 | Nogami | H04L 1/1614 |
| 2021/0352665 | A1* | 11/2021 | Kang | H04L 1/08 |
| 2021/0385668 | A1* | 12/2021 | Kang | H04W 72/046 |
| 2021/0400649 | A1* | 12/2021 | Kang | H04B 7/0695 |
| 2022/0007410 | A1* | 1/2022 | Cirik | H04L 5/0078 |
| 2022/0029659 | A1* | 1/2022 | Liu | H04B 1/7143 |
| 2022/0030607 | A1* | 1/2022 | Liu | H04L 27/2602 |
| 2022/0039123 | A1* | 2/2022 | Wu | H04L 27/2602 |
| 2022/0078718 | A1* | 3/2022 | Hoshino | H04W 72/02 |
| 2022/0124633 | A1* | 4/2022 | Hoshino | H04W 16/28 |
| 2022/0132430 | A1* | 4/2022 | Hoshino | H04L 5/0051 |
| 2022/0132436 | A1* | 4/2022 | Hoshino | H04L 5/0048 |
| 2022/0166484 | A1* | 5/2022 | Go | H04W 72/046 |
| 2022/0191839 | A1* | 6/2022 | Ying | H04L 1/1812 |
| 2022/0191912 | A1* | 6/2022 | Liu | H04W 72/23 |
| 2022/0224470 | A1* | 7/2022 | Matsumura | H04W 72/20 |
| 2022/0225389 | A1* | 7/2022 | Go | H04L 5/0094 |
| 2022/0287020 | A1* | 9/2022 | Park | H04B 7/0695 |
| 2022/0304018 | A1* | 9/2022 | Ko | H04W 74/0833 |
| 2022/0346050 | A1* | 10/2022 | Ko | H04W 56/00 |
| 2023/0127256 | A1* | 4/2023 | Cha | H04W 52/242 |
| | | | | 370/318 |

FOREIGN PATENT DOCUMENTS

| | | | |
|---|---|---|---|
| WO | 2019095893 A1 | | 5/2019 |
| WO | WO-2020041757 A1 | * | 2/2020 |

OTHER PUBLICATIONS

International Search Report and Written Opinion—PCT/US2021/020502—ISA/EPO—Jun. 23, 2021.

3rd Generation Partnership Project, "3GPP TS 38.133: 5G, NR, Requirements for Support of Radio Resource Management (Release 15)", ETSI TS 138 133 V15.2.0 (Jul. 2018), pp. 1-81.

3rd Generation Partnership Project, "3rd Generation Partnership Project, Technical Specification Group Radio Access Network, NR, Requirements for Support of Radio Resource Management (Release 15)", 3GPP TS 38.133 V15.0.0 (Dec. 2017), pp. 1-41.

* cited by examiner

UPLINK TIMING ASSOCIATED WITH UPLINK TRANSMISSION CONFIGURATION INDICATION (TCI) STATE

CROSS-REFERENCE TO RELATED APPLICATION

The present application claims the benefit of U.S. Provisional Patent Application No. 63/002,238, filed on Mar. 30, 2020, and titled "UPLINK TIMING ASSOCIATED WITH UPLINK TRANSMISSION CONFIGURATION INDICATION (TCI) STATE," the disclosure of which is expressly incorporated by reference herein in its entirety.

FIELD OF THE DISCLOSURE

Aspects of the present disclosure generally relate to wireless communications, and more particularly to associating uplink timing with uplink transmission configuration indication (TCI) states.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Uplink communication currently only supports one transmit timing for each timing advance group (TAG). This may, however, induce timing jitter at the receiver side (e.g., base station) when the UE transmit configuration changes. For example, when an uplink transmit beam switches, the receiver timing can shift by the difference of propagation delay. The timing jitter in the receiver may result in inter-symbol and/or inter-carrier interference and impair overall system performance. It would be desirable to provide a more flexible uplink timing determination for 5G NR communications.

SUMMARY

In one aspect of the present disclosure, a method of wireless communication by a UE (user equipment) includes setting a timing parameter based on an uplink TCI (transmission configuration indication) state. The method also includes adjusting uplink transmit timing for an uplink transmission based on the timing parameter.

In another aspect of the present disclosure, a UE (user equipment) for wireless communication includes a memory and at least one processor operatively coupled to the memory. The memory and the processor(s) are configured to set a timing parameter based on an uplink TCI (transmission configuration indication) state. The memory and the processor(s) are also configured to adjust uplink transmit timing for an uplink transmission based on the timing parameter.

In another aspect of the present disclosure, a base station for wireless communication includes a memory and at least one processor operatively coupled to the memory. The memory and the processor(s) are configured to set a timing parameter for a user equipment (UE) based on an uplink TCI (transmission configuration indication) state. The memory and the processor(s) are also configured to adjust uplink transmit timing for an uplink transmission based on the timing parameter.

In another aspect of the present disclosure, a UE (user equipment) includes means for setting a timing parameter based on an uplink TCI (transmission configuration indication) state. The UE also includes means for adjusting uplink transmit timing for an uplink transmission based on the timing parameter.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
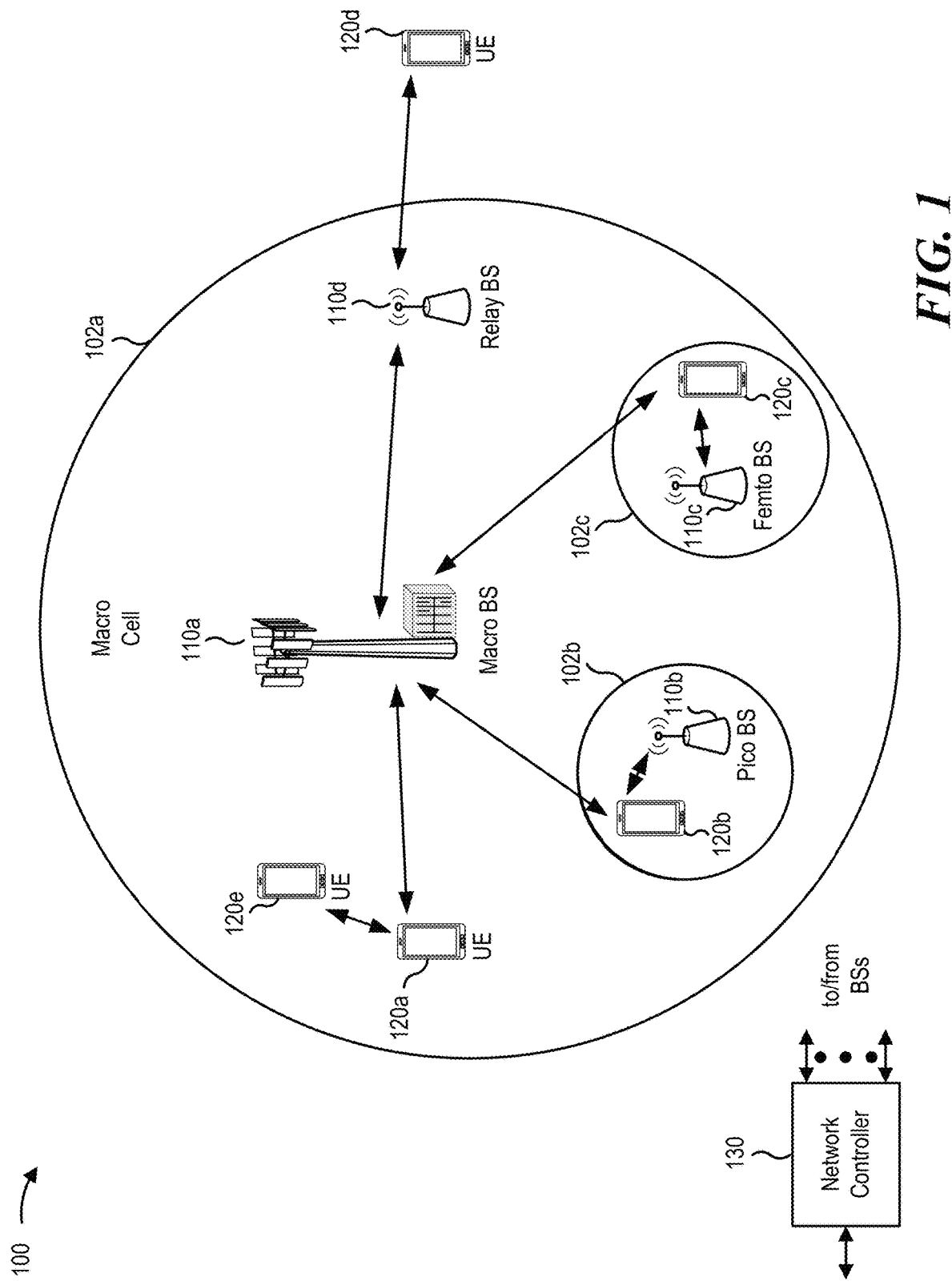
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

5G NR supports configuration of transmission configuration indication (TCI) states for quasi-co-location (QCL) indication for the physical downlink control channel (PDCCH) and physical downlink shared channel (PDSCH). Each TCI state consists of one downlink reference signal (RS) set for different QCL types. The downlink reference signal can be a synchronization signal block (SSB), a tracking reference signal (TRS), and an aperiodic/periodic/semi-persistent channel state information reference signal (CSI-RS). The QCL type indicates the time, frequency, and spatial relationship with the source reference signal. Exemplary QCL types are defined in 3GPP TR 38.214 section 5.1.5 and include type A (Doppler shift, Doppler spread, average delay, delay spread), type B (Doppler shift, Doppler spread), type C (Doppler shift and average delay), and type D (spatial Rx (receive) parameter).

For DL channel tracking, tracking reference signal (TRS) resources may be configured. Separate tracking loops (e.g., time, frequency, Doppler, and delay) may be maintained for each TRS. Each TRS may be used as the source reference signal (RS) for downlink (DL) timing (e.g., types A/C) when configured in a TCI state.

5G NR supports multiple DL timing references, one for each configured TRS. Each DL channel uses a proper timing reference as indicated by the TCI state. Multiple timing references are useful, for example, in a multiple beam-based communication scenario, such as NR FR2 (frequency two—millimeter wave). Each beam paired link may undergo different physical propagation paths and have different delays. Therefore, separate TRSs may be configured for each beam paired link for time tracking.

Unlike DL, the UL currently only supports one Tx (transmit) timing for each timing advance group (TAG). This may, however, induce timing jitter at the receiver side (e.g., base station) when the UE Tx configuration changes. For example, when an UL Tx beam switches, the receiver timing can shift by the difference of propagation delay. The timing jitter in the receiver may result in inter-symbol and/or inter-carrier interference and impair overall system performance. Advanced UE features supporting multi-beam/multi-panel simultaneous transmission may lead to additional timing inaccuracies using a single timing advance (TA) command (or transmit timing).

According to the present disclosure, an UL timing determination for 5G NR is provided when an UL TCI framework is supported. More specifically, depending on the QCL type source RS indicated by the UL TCI state, the UE adjusts its transmit timing. That is, the UE adjusts its transmit timing as a function of the TCI. Depending on the source reference signal, the UE can calculate the timing differently. Any QCL type that indicates time and frequency parameters is contemplated by the present disclosure, such as QCL types A, B, and C, for example.

FIG. 1 is a diagram illustrating a network 100 in which aspects of the present disclosure may be practiced. The network 100 may be a 5G or NR network or some other wireless network, such as an LTE network. The wireless network 100 may include a number of base stations (BSs) 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110.

As indicated above, FIG. 1 is provided merely as an example. Other examples may differ from what is described with regard to FIG. 1.

Figure 2:
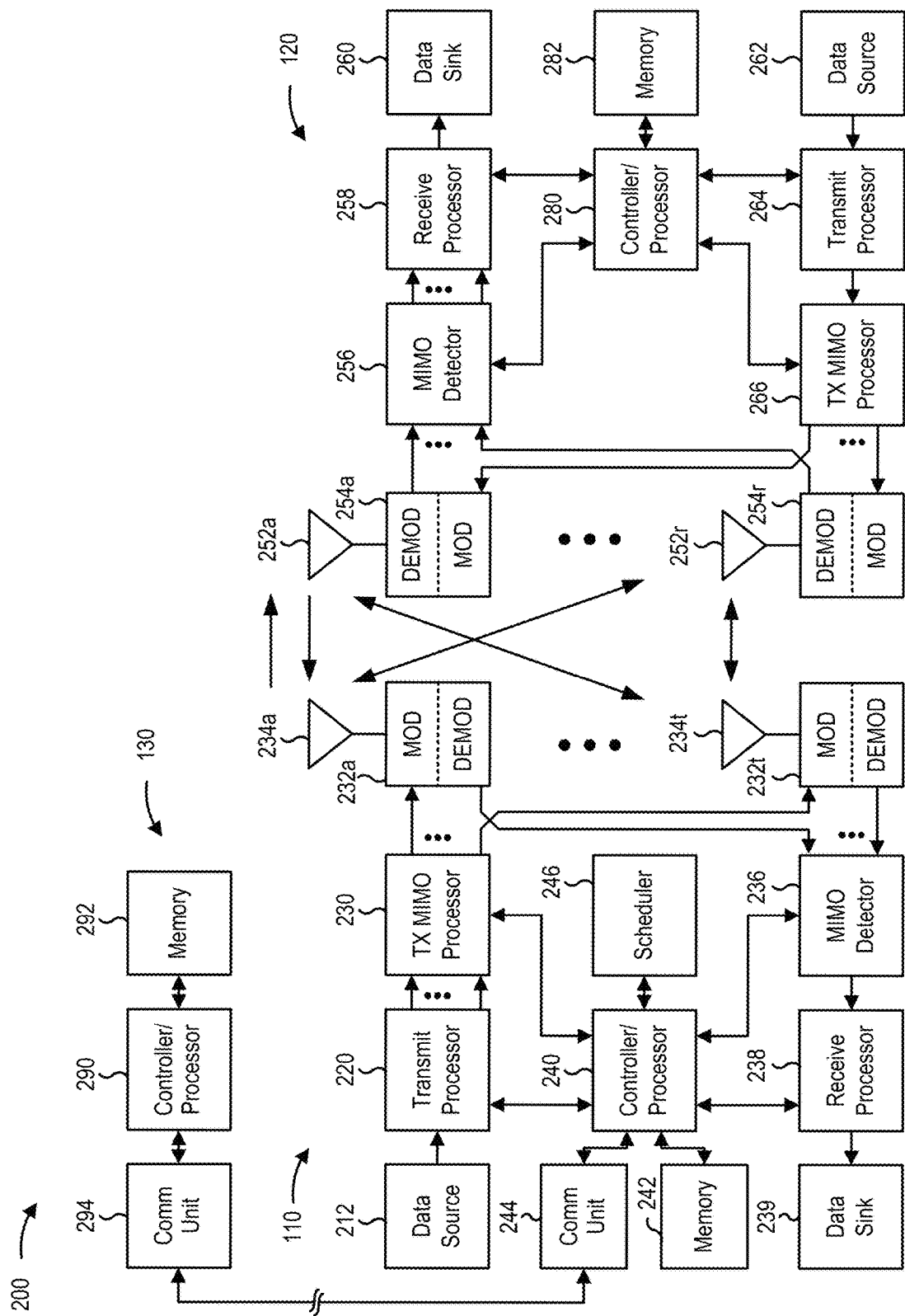
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning for non-linearities, as described in more detail elsewhere. For example, the controller/processor 240 of the base station 110, the controller/processor 280 of the UE 120, and/or any other component(s) of FIG. 2 may perform or direct operations of, for example, the processes of FIGS. 6-8 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for setting, means for adjusting, means for indicating, means for receiving, means for deriving, means for calculating, and means for continuing to apply. Such means may include one or more components of the UE 120 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

As described above, 5G NR supports configuration of transmission configuration indication (TCI) states for quasi-co-location (QCL) indication for the physical downlink control channel (PDCCH) and physical downlink shared channel (PDSCH). Each TCI state consists of one downlink reference signal (RS) set for different QCL types. The downlink reference signal can be a synchronization signal block (SSB), a tracking reference signal (TRS), and an aperiodic/periodic/semi-persistent channel state information reference signal (CSI-RS). The QCL type indicates the time, frequency, and spatial relationship with the source reference signal. Exemplary QCL types are defined in 3GPP TR 38.214 section 5.1.5 and include type A (Doppler shift, Doppler spread, average delay, delay spread), type B (Doppler shift, Doppler spread), type C (Doppler shift and average delay), and type D (spatial Rx parameter).

For DL channel tracking, tracking reference signal (TRS) resources may be configured. Separate tracking loops (e.g., time, frequency, Doppler, and delay) may be maintained for each TRS. Each TRS may be used as the source reference signal (RS) for downlink (DL) timing (e.g., types A/C) when configured in a TCI state.

5G NR supports multiple DL timing references, one for each configured TRS. Each DL channel uses a proper timing reference as indicated by the TCI state. Multiple timing references are useful, for example, in a multiple beam-based communication scenario, such as NR FR2 (frequency two—millimeter wave). Each beam paired link may undergo different physical propagation paths and have different delays. Therefore, separate TRSs may be configured for each beam paired link for time tracking.

Figure 3:
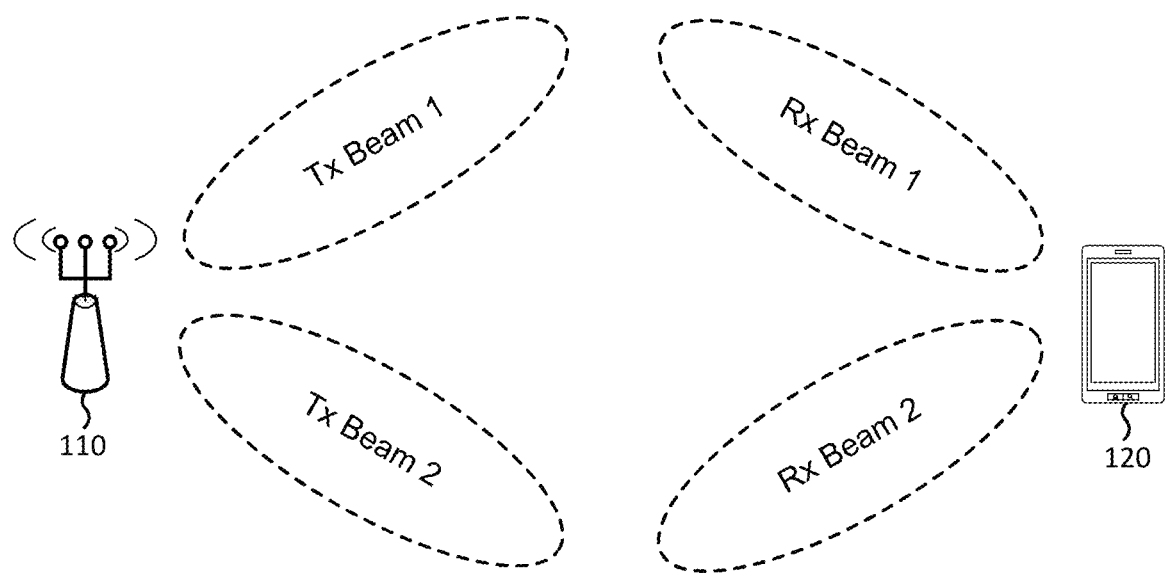
FIG. 3 is an illustration of beam pairing, in accordance with certain aspects of the present disclosure.

FIG. 3 is an illustration of beam pairing, in accordance with certain aspects of the present disclosure. Referring to FIG. 3, a first transmit beam, Tx beam 1, from a base station (BS) 110 is paired with a first receive beam (Rx beam 1) at a user equipment (UE) 120. The first transmit beam, Tx beam 1, is associated with a first CSI-RS, CSI-RS1, for beam management and a first tracking reference signal, TRS1, for delay. In this example, TCI state 1 is defined as: (CSI-RS1 for QCL-Type D, TRS1 for QCL-Type A). A second transmit beam, Tx beam 2, from the base station 110 is paired with a second receive beam, Rx beam 2, at the UE 120. The second transmit beam, Tx beam 2, is associated with a second CSI-RS, CSI-RS2, for beam management and a second tracking reference signal, TRS2 for delay. In this example, TCI state 2 is defined as: (CSI-RS2 for QCL-Type D, TRS2 for QCL-Type A). If a PDCCH and PDSCH is configured with TCI state 1, the UE uses the first receive beam, Rx beam 1, and the receive timing estimate from TRS1 for receiving the PDCCH and PDSCH.

For uplink (UL) beam management, the spatial relation (UL spatial Tx parameter) to be used for UL transmission is indicated via radio resource control (RRC) configuration and in downlink (DL) control information, which is similar to QCL-Type D in the DL, assuming beam correspondence.

UL timing determination in 5G NR is similar to LTE. NR uses timing advance (TA) commands from the base station for UL transmit timing adjustment where multiple timing advance groups (TAGs) are supported in carrier aggregation and in dual connectivity scenarios. The same timing is assumed for the physical uplink control channel (PUCCH), physical uplink shared channel (PUSCH), and sounding reference signals (SRSs) within the same TAG.

It would be desirable for an uplink TCI framework to be similar to the downlink TCI framework. Other QCL types, and also different source RSs, may be supported for the uplink. It would also be desirable for the signaling aspects to be more symmetric between the uplink and downlink.

To have a unified DL/UL TCI framework, an UL TCI contains a source RS to indicate an UL Tx beam for a target UL RS/channel. The source RS can be an SRS, SSB, and CSI-RS. The target UL RS/channel can be a PUCCH, SRS, physical random access channel (PRACH), and PUSCH. Other QCL types similar to DL are also possible. Table 1 illustrates possible TCI states for uplink communications.

TABLE 1

| Valid UL-TCI State Configuration | Source (reference) RS | (target) UL RS | [QCL Type] |
|---|---|---|---|
| 1 | SRS resource (for BM) + [panel ID] | Demodulation reference signal (DM-RS) for PUCCH or SRS or PRACH | Spatial-relation |
| 2 | DL RS (a CSI-RS resource or a SSB) + [panel ID] | DM-RS for PUCCH or SRS or PRACH | Spatial-relation |
| 3 | DL RS (a CSI-RS resource or a SSB) + [panel ID] | DM-RS for PUSCH | Spatial-relation + [port(s)-indication] |
| 4 | DL RS (a CSI-RS resource or a SSB) and SRS resource + [panel ID] | DM-RS for PUSCH | Spatial-relation + [port(s)-indication] |
| 5 | SRS resource + [panel ID] | DM-RS for PUSCH | Spatial-relation + [port(s)-indication] |
| 6 | UL RS (a SRS for BM) and SRS resource + [panel ID] | DM-RS for PUSCH | Spatial-relation + [port(s)-indication] |

Unlike DL, the UL currently only supports one Tx timing for each timing advance group (TAG). This may, however, induce timing jitter at the receiver side (e.g., base station) when the UE Tx configuration changes. For example, when an UL Tx beam switches, the receiver timing can shift by the difference of propagation delay. The timing jitter in the receiver may result in inter-symbol and/or inter-carrier interference and impair overall system performance. Advanced UE features supporting multi-beam/multi-panel simultaneous transmission may lead to additional timing inaccuracies using a single timing advance (TA) command (or transmit timing).

According to the present disclosure, an UL timing determination for 5G NR is provided when an UL TCI framework is supported. More specifically, depending on the QCL type source RS indicated by the UL TCI state, the UE adjusts its transmit timing. That is, the UE adjusts its transmit timing as a function of the TCI. Depending on the source reference signal, the UE can calculate the timing differently. Any QCL type that indicates time and frequency parameters is contemplated by the present disclosure, such as QCL types A, B, and C, for example.

Two cases are now considered. If the QCL type source reference signal in the UL TCI is an SRS of a configured SRS resource set, the UE follows the same transmit timing as the SRS resource set.

In the second case, the QCL type source reference signal in the UL TCI is a DL RS, such as the SSB. In the second case, the UE may calculate a beam-specific delay adjustment from the DL RS, if the DL RS is a TRS (e.g., configurations 2, 3, and 4 in Table 1). The tracking reference signal (TRS) enables the UE to define the timing parameter. The beam-specific delay adjustment may be applied to the common TA (timing advance) value, to determine beam-specific transmit timing.

Different transmit timing may be calculated and applied for different uplink channels/SRS (e.g., UL TCI state). Each uplink beam may have its own uplink TCI state. The TCI states need not be different for each beam, however. Multiple beams may have the same uplink timing parameter. The transmit timing $t_i$ of the channel/SRS (UL TCI state) i is calculated as follows:

$$t_i = T_{Ref} + \Delta_i,$$

where $T_{Ref}$ is the common reference timing calculated/adjusted by the timing advance (TA) command for the timing advance group (TAG), and $\Delta_i$ is the adjustment for each channel/SRS (UL TCI state). The initial value of $\Delta_i$ can be zero, (e.g., same timing for all channel/SRS (UL TCI state) in a TAG).

Each UL channel or SRS has a spatial QCL assumption as seen in Table 2.

TABLE 2

| UL channels/signals | PUCCH codebook-based PUSCH | SRS except SRS-SetUse = 'nonCodebook' | SRS with SRS-SetUse = 'nonCodebook' |
|---|---|---|---|
| Higher layer parameters related to spatial QCL Reference RS | PUCCH-SpatialRelationInfo SSB-Index NZP-CSI-RS-ResourceId SRS-ResourceID | SRS-SpatialRelationInfo | SRS-AssocCSIRS NZP-CSI-ResourceConfigId |

According to aspects of the present disclosure, within a timing advance group (TAG), a sub-TAG definition is supported. This sub-TAG definition may be RRC configured or more dynamically updated/activated with a media access control-control element (MAC-CE). The UE may indicate support of sub-TAGs via capability signaling including a maximum number of sub-TAGs. The exchange of capability information between the base station and UE occurs prior to the timing adjustment procedure. Each UL TCI state may be tagged with a sub-TAG index and each sub-TAG may contain one or more UL TCI states.

A new TA command (e.g., carried in a MAC-CE or downlink control information (DCI)) may be defined. In a first option, the new timing advance (TA) command may include one or more sub-TAG indexes to which the command is applied. Alternatively, a single MAC-CE may update multiple sub-TAG TA values using multiple octets within the same MAC-CE. The legacy TA command may still be applied commonly for all sub-TAGs.

According to further aspects of the present disclosure, a new higher layer parameter may be defined. The new parameter may be referred to as "timingReferenceRS." The new higher layer parameter may indicate the SSB, CSI-RS (desirably, TRS), or SRS to which the TA command is applied. The UE measures the timingReferenceRS and estimates delay, spreading, etc. The estimate is then applied for UE timing.

For example, TRS1 and TRS2 may be configured for QCL-Type C in UL TCI1 and TCI2, respectively. It is assumed that TRS1 is configured as the timingReferenceRS. It is assumed, based on the UE time tracking loop, TRS1 and TRS2 have a $\Delta_T$ Rx timing difference. Thus, when the UE transmits UL beams with TCI2, on top of the current TA value, T, the UE applies compensation (e.g., $T+\Delta_T$). Beam reciprocity is assumed. Details of the TA compensation with respect to the timingReferenceRS are specified based on UE implementation.

If the UL Tx beam is quasi-co-located with a DL RS (SSB or non-zero power (NZP)-CSI-RS), the timing adjustment may be calculated from the Rx timing of the DL RS. If the UE is configured with a tracking reference signal (TRS) spatially quasi-co-located with the same DL RS, the Rx timing adjustment may be derived from a time tracking loop or channel power delay profile (PDP) estimation associated with the TRS.

Figure 4:
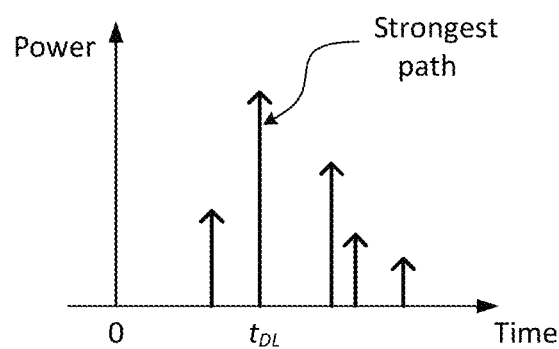
FIG. 4 is an illustration of setting uplink timing based on a strongest path, in accordance with aspects of the present disclosure.

FIG. 4 is an illustration of setting uplink timing based on a strongest path, in accordance with aspects of the present disclosure. An example will now be provided for a codebook-based PUSCH. Along with scheduling DCI, the UL beam is indicated by a QCL reference to a DL NZP-CSI-RS or SSB. The UE is configured with a TRS quasi-co-located with the same NZP-CSI-RS or SSB. The UE estimates the power delay profile (PDP) of the DL multipath channel from the TRS, as seen in FIG. 4. The Rx reference time (time 0) is determined based on Rx fast Fourier transform (FFT) timing. From the estimated PDP, a strongest path delay or root mean square (RMS) delay spread may be used for the UL timing adjustment $\Delta_i = -\alpha \times t_{DL}$, where $\alpha$ is a scaling factor. For example, the estimated PDP can be scaled and used to adjust the timing parameter for the beam.

If the UL Tx beam is quasi-co-located with a DL RS but there is no TRS quasi-co-located with the DL RS, or the UL Tx beam is not quasi-co-located with a DL RS, then the UL is spatially quasi-co-located with an SRS resource. In some cases, the SRS (except SRS-SetUse='nonCodebook') is not configured with a spatial relationship, e.g., SRS-SpatialRelationInfo. For example, a UE may have performed autonomous beam selection (e.g., no previous SRS transmission). In this case, according to another aspect of the present disclosure, the timing adjustment may be calculated from Rx timing of one or more DL RSs. If the UE is configured with N≥1 TRS resources, the UL timing adjustment can be determined as $\Delta_i = -\alpha \times t_{DL}$. The parameter $t_{DL}$ may be an average or median value of strongest path delays (or RMS delay spread) of N PDPs estimated by N TRSs. The parameter $t_{DL}$ may be a minimum value of strongest path delays (or RMS delay spread) of N PDPs estimated by N TRSs. In another configuration, the parameter $t_{DL}$ may be a strongest path delay (or RMS delay spread) of a composite PDP of N PDPs, or a default value (possibly at $\Delta_i=0$) signaled by a base station or specified in the 3GPP standards.

In some cases, the UE may not be able to apply different UL Tx timing for different UL channels and SRS (e.g., due to a UE capability limitation). In this case, the UE may apply a single timing adjustment value A for all UL channels and the SRS. The parameter A may be derived from SSBs or configured DL RSs (e.g. TRS resources). A similar calculation, as discussed above, may be used. The UE may be configured by a base station to use a specific DL RS (or a set of RSs) for timing calculation. Alternatively, a default DL RS may be specified in the 3GPP standards. In one example, the default DL RS is the TRS resource with the lowest ID.

According to still another aspect of the present disclosure, when UCI is transmitted over the PUSCH instead of the PUCCH, PUSCH timing may be applied. That is, the PUSCH beam (e.g., TCI state) may differ from the PUCCH beam (e.g., TCI state). In this case, the TCI state (e.g., timing information) for the PUSCH is used for control information transmitted over the PUSCH.

According to another aspect of the present disclosure, when there is bandwidth part (BWP) switching, the timing may change. Thus, the UE may use the timing from the original BWP within a grace period. The grace period implies a certain period until the UE calculates a new reliable timing adjustment in the new BWP. The grace period may be part of a UE capability or a configured parameter for the BWP switching.

A further aspect of the present disclosure addresses the situation where a grant-free ultra-reliable low-latency communication (URLLC) transmission from a UE punctures its own ongoing enhanced mobile broadband (eMBB) PUSCH transmission. In some cases, the UL Tx timing may be different between the original UL transmission and the grant-free transmission. In this case, to prevent the puncturing, the grant-free transmission may follow the timing of the original PUSCH timing.

Figure 5A:
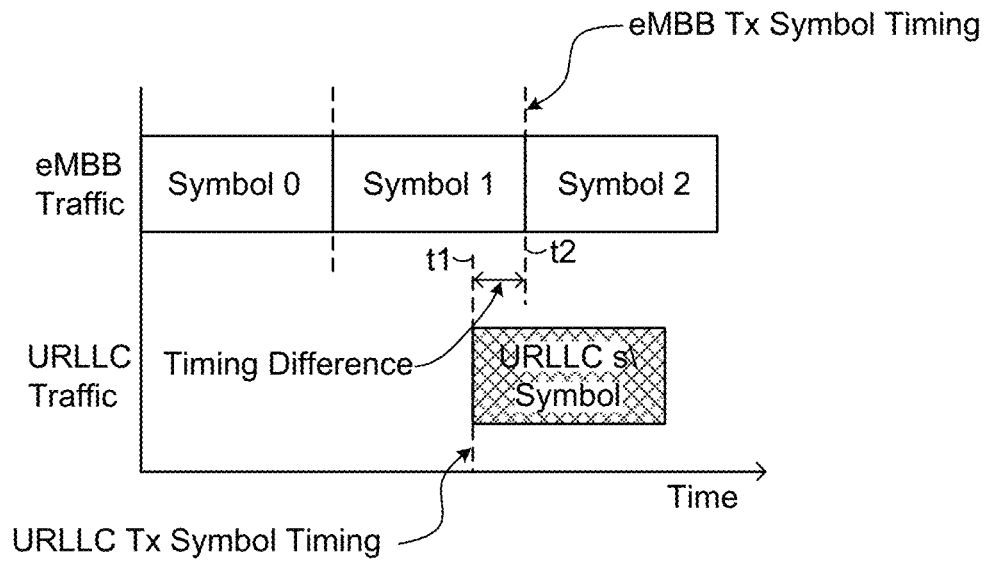
FIGS. 5A and 5B illustrate timing based on traffic type, in accordance with aspects of the present disclosure.
Figure 5B:
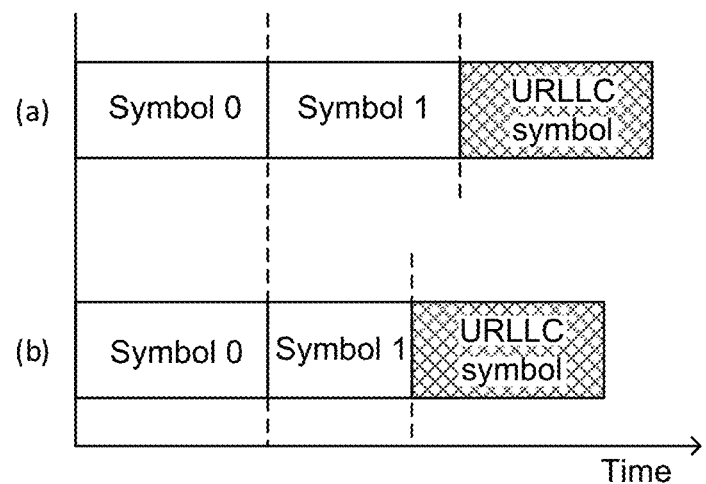

FIGS. 5A and 5B illustrate timing based on traffic type, in accordance with aspects of the present disclosure. As seen in FIG. 5A, the URLLC Tx timing has a timing offset or timing difference relative to the eMBB transmission. The URLLC transmits at time t1, whereas symbol 2 of the eMBB transmission transmits at time t2. In this example, the timing offset (e.g., timing difference) is less than a threshold. According to aspects of the present disclosure, the URLLC Tx timing is shifted (by the timing offset or timing difference) to follow the same Tx timing of the original eMBB Tx timing because the timing offset is less than the threshold. Thus, in this aspect, the URLLC symbol transmits at time t2, instead of time t1.

Alternatively, if the timing offset between the two uplink transmissions is larger than the threshold, some samples of the original PUSCH may be dropped, as shown in FIG. 5B. In the first example (a), symbol 2 of the enhanced mobile broadband (eMBB) traffic is punctured by the ultra-reliable low-latency communications (URLLC) traffic. In the first example (a), the URLLC Tx timing is shifted by the timing offset to follow the same Tx timing of the original eMBB Tx timing. In the second example (b), some samples of eMBB symbol 1 are dropped in addition to symbol 2, to accommodate the URLLC Tx timing. That is, in the second example (b), the URLLC timing is not shifted.

As indicated above, FIGS. 3-5B are provided as examples. Other examples may differ from what is described with respect to FIGS. 3-5B.

Figure 6:
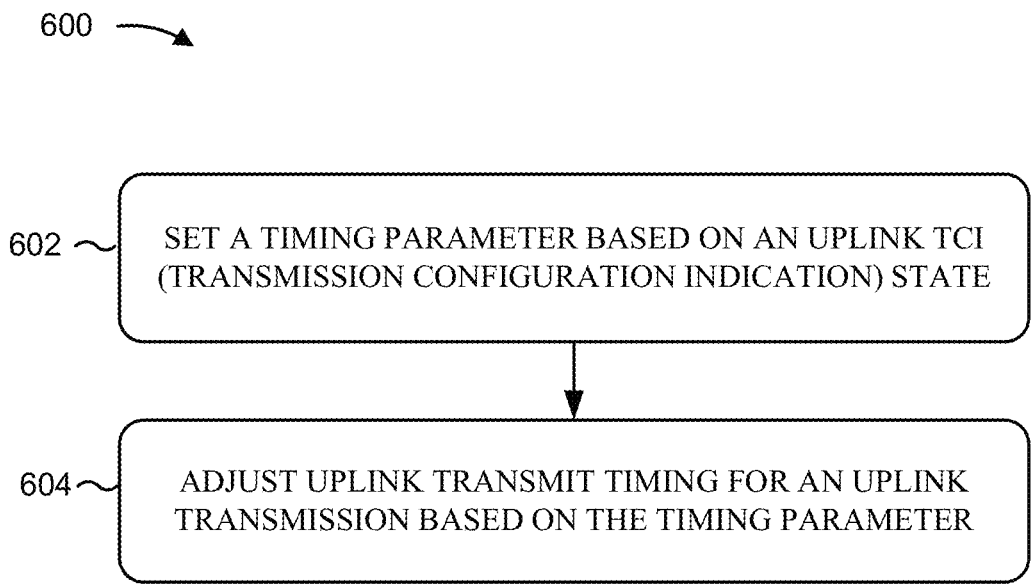
FIG. 6 is a diagram illustrating an example process performed, for example, by a user equipment (UE), in accordance with various aspects of the present disclosure.

FIG. 6 is a diagram illustrating an example process 600 performed, for example, by a UE, in accordance with various aspects of the present disclosure. The example process 600 is an example of setting uplink timing associated with an uplink transmission configuration indication (TCI) state.

As shown in FIG. 6, in some aspects, the process 600 may include setting a timing parameter based on an uplink TCI (transmission configuration indication) state (block 602). For example, the UE (e.g., using the antenna 252, DEMOD 254, MIMO detector 256, receive processor 258, controller/processor 280, memory 282, and or the like) can set the timing parameter, or the base station (e.g., using the antenna 234, MOD 232, TX MIMO processor 230, transmit processor 220, controller/processor 240, memory 242, and or the like) can set the timing parameter.

As shown in FIG. 6, in some aspects, the process 600 may include adjusting uplink transmit timing for an uplink transmission based on the timing parameter (block 604). For example, the UE (e.g., using the antenna 252, MOD 254, TX MIMO processor 266, controller/processor 280, memory 282, and or the like) can adjust the uplink transmit timing, or the base station (e.g., using the antenna 234, MOD 232, TX MIMO processor 230, transmit processor 220, controller/processor 240, memory 242, and or the like) can adjust the uplink transmit timing.

Implementation Examples are Described in the Following Numbered Clauses:

1. A method of wireless communication by a UE (user equipment), comprising:
   setting a timing parameter based on an uplink TCI (transmission configuration indication) state; and
   adjusting uplink transmit timing for an uplink transmission based on the timing parameter.
2. The method of clause 1, further comprising setting the timing parameter based on a quasi-collocated (QCL) source reference signal (RS) specified by the uplink TCI state.
3. The method of either clause 1 or 2, in which the QCL source reference signal comprises an SRS (sounding reference signal) of a configured SRS resource set, and in which setting the timing parameter comprises setting the timing parameter to match a timing advance of the SRS resource set.
4. The method of any of the preceding clauses, in which setting the timing parameter comprises setting the timing parameter by calculating a beam specific timing advance, in which the QCL source reference signal comprises a downlink reference signal including a TRS (tracking reference signal), SSB (synchronization signal block) or a CSI-RS (channel state information reference signal).
5. The method of any of the preceding clauses, further comprising adjusting uplink transmit timing for a plurality of uplink beams, each uplink beam having its own uplink TCI state.
6. The method of any of the preceding clauses, further comprising indicating a maximum number of sub-timing advance groups (TAGs) supported by the UE.
7. The method of any of the preceding clauses, further comprising receiving an indication of a number of sub-timing advance groups (TAGs) to support.
8. The method of any of the preceding clauses, in which a timing advance command includes at least one sub-timing advance group (TAG) index, each sub-TAG comprising at least one uplink TCI state.
9. The method of any of the preceding clauses, in which a media access control-control element (MAC-CE) comprises a plurality of sub-timing advance group (TAG) updates.
10. The method of any of the preceding clauses, further comprising:
    receiving an indication of a timing reference RS (reference signal);
    deriving a timing estimate for the timing reference RS; and
    adjusting the timing parameter based on the timing estimate.
11. The method of any of the preceding clauses, further comprising adjusting the timing based on a time tracking loop or channel power delay profile estimate of a TRS (tracking reference signal) spatially quasi-located with a source downlink RS quasi-located with the uplink transmission.
12. The method of any of the preceding clauses, further comprising calculating the timing adjustment from a timing estimate of at least one downlink reference signal when a source reference signal is not a tracking reference signal, or the source reference signal is a SRS (sounding reference signal) spatially quasi-located with the uplink transmission and the SRS is not configured with spatial relationship information.
13. The method of any of the preceding clauses, in which the calculating is based on a smallest value from timing estimates of a plurality of downlink reference signals or an average of timing estimates of the plurality of downlink reference signals.
14. The method of any of the preceding clauses, further comprising adjusting uplink timing for a physical uplink shared channel (PUSCH) based on a parameter different from a parameter for adjusting a timing for a physical uplink control channel (PUCCH), in which a TCI state for the PUCCH differs from a TCI state for the PUSCH.
15. The method of any of the preceding clauses, further comprising continuing to apply the adjusted uplink transmit timing for a period of time after switching bandwidth parts (BWPs).
16. The method of any of the preceding clauses, in which a timing offset is less than a threshold, the method further comprising adjusting the timing parameter in accordance with the timing offset and a transmission mode, the timing offset being between a high priority grant free transmission and a low priority transmission.

17. The method of any of the preceding clauses, further comprising:
setting the timing parameter by measuring a source reference signal indicated by the uplink TCI state; and
the adjusting further comprises adjusting all uplink beams with a single timing adjustment based on the measuring of the source reference signal.

18. An apparatus of a UE (user equipment) for wireless communication, comprising:
a memory, and
at least one processor operatively coupled to the memory, the memory and the at least one processor configured:
to set a timing parameter based on an uplink TCI (transmission configuration indication) state; and
to adjust uplink transmit timing for an uplink transmission based on the timing parameter.

19. The apparatus of clause 18, in which the at least one processor is further configured to set the timing parameter based on a quasi-collocated (QCL) source reference signal (RS) specified by the uplink TCI state.

20. The apparatus of either clause 18 or 19, in which the QCL source reference signal comprises an SRS (sounding reference signal) of a configured SRS resource set, and in which the at least one processor is further configured to set the timing parameter by setting the timing parameter to match a timing advance of the SRS resource set.

21. The apparatus of any of the clauses 18-20, in which the at least one processor is further configured to set the timing parameter by setting the timing parameter by calculating a beam specific timing advance, in which the QCL source reference signal comprises a downlink reference signal including a TRS (tracking reference signal), SSB (synchronization signal block) or a CSI-RS (channel state information reference signal).

22. The apparatus of any of the clauses 18-21, in which the at least one processor is further configured to adjust uplink transmit timing for a plurality of uplink beams, each uplink beam having its own uplink TCI state.

23. The apparatus of any of the clauses 18-22, in which the at least one processor is further configured to indicate a maximum number of sub-timing advance groups (TAGs) supported by the UE.

24. The apparatus of any of the clauses 18-23, in which the at least one processor is further configured:
to set the timing parameter by measuring a source reference signal indicated by the uplink TCI state; and
to adjust by adjusting all uplink beams with a single timing adjustment based on the measuring of the source reference signal.

25. An apparatus of a base station for wireless communication, comprising:
a memory, and
at least one processor operatively coupled to the memory, the memory and the at least one processor configured:
to set a timing parameter for a user equipment (UE) based on an uplink TCI (transmission configuration indication) state; and
to adjust uplink transmit timing for an uplink transmission based on the timing parameter.

26. The apparatus of clause 25, in which the at least one processor is configured to receive an indication, from the UE, of a maximum number of sub-timing advance groups (TAGs) supported by the UE, prior to setting the timing parameter.

27. The apparatus of either clause 25 or 26, in which the at least one processor is configured to transmit an indication of a number of sub-timing advance groups (TAGs) to support.

28. The apparatus of any of the clauses 25-27, in which the at least one processor is configured to transmit a timing advance command including at least one sub-timing advance group (TAG) index, each sub-TAG comprising at least one uplink TCI state.

29. The apparatus of any of the clauses 25-28, in which the at least one processor is configured to transmit a media access control-control element (MAC-CE) comprising a plurality of sub-timing advance group (TAG) updates.

30. A UE (user equipment) for wireless communication, comprising means for performing a method of any of clauses 1 to 17.

31. A non-transitory computer-readable medium storing code for wireless communication, the code comprising instructions executable by a processor to perform a method of any of clauses 1 to 17.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a UE (user equipment), comprising:
   setting a timing advance parameter for a timing advance group (TAG) of the UE based on a quasi-collocated (QCL) source reference signal (RS) indicated by an uplink TCI (transmission configuration indication) state, the QCL source RS from a configured resource set; and
   adjusting uplink transmit timing for an uplink transmission based on the timing advance parameter for the TAG of the UE, the timing advance parameter being based on the QCL source RS indicated by the uplink TCI state.

2. The method of claim 1, in which the QCL source reference signal comprises an SRS (sounding reference signal) of a configured SRS resource set, and in which setting the timing advance parameter comprises setting the timing advance parameter to match a timing advance of the SRS resource set.

3. The method of claim 1, in which setting the timing advance parameter comprises setting the timing advance parameter by calculating a beam specific timing advance, in which the QCL source reference signal comprises a downlink reference signal including a TRS (tracking reference signal), SSB (synchronization signal block) or a CSI-RS (channel state information reference signal).

4. The method of claim 1, further comprising adjusting uplink transmit timing for a plurality of uplink beams, each uplink beam having its own uplink TCI state.

5. The method of claim 1, further comprising indicating a maximum number of sub-timing advance groups (TAGs) supported by the UE.

6. The method of claim 1, further comprising receiving an indication of a number of sub-timing advance groups (TAGs) to support.

7. The method of claim 1, in which a timing advance command includes at least one sub-timing advance group (TAG) index, each sub-TAG comprising at least one uplink TCI state.

8. The method of claim 1, in which a media access control-control element (MAC-CE) comprises a plurality of sub-timing advance group (TAG) updates.

9. The method of claim 1, further comprising:
   receiving an indication of a timing reference RS (reference signal);
   deriving a timing estimate for the timing reference RS; and
   adjusting the timing advance parameter based on the timing estimate.

10. The method of claim 1, further comprising adjusting the timing based on a time tracking loop or channel power delay profile estimate of a TRS (tracking reference signal) spatially quasi-located with a source downlink RS quasi-located with the uplink transmission.

11. The method of claim 1, further comprising calculating the timing adjustment from a timing estimate of at least one downlink reference signal when the source reference signal is not a tracking reference signal, or the source reference signal is a SRS (sounding reference signal) spatially quasi-located with the uplink transmission and the SRS is not configured with spatial relationship information.

12. The method of claim 11, in which the calculating is based on a smallest value from timing estimates of a plurality of downlink reference signals or an average of timing estimates of the plurality of downlink reference signals.

13. The method of claim 1, further comprising adjusting uplink timing for a physical uplink shared channel (PUSCH) based on a parameter different from a parameter for adjusting a timing for a physical uplink control channel (PUCCH), in which a TCI state for the PUCCH differs from a TCI state for the PUSCH.

14. The method of claim 1, further comprising continuing to apply the adjusted uplink transmit timing for a period of time after switching bandwidth parts (BWPs).

15. The method of claim 1, in which a timing offset is less than a threshold, the method further comprising adjusting the timing advance parameter in accordance with the timing offset and a transmission mode, the timing offset being between a high priority grant free transmission and a low priority transmission.

16. The method of claim 1, further comprising:
   setting the timing advance parameter by measuring the source reference signal indicated by the uplink TCI state; and
   the adjusting further comprises adjusting all uplink beams with a single timing adjustment based on the measuring of the source reference signal.

17. An apparatus of a UE (user equipment) for wireless communication, comprising:
   memory, and
   at least one processor operatively coupled to the memory, the memory and the at least one processor configured:
      to set a timing advance parameter for a timing advance group (TAG) of the UE based on a quasi-collocated (QCL) source reference signal (RS) indicated by an uplink TCI (transmission configuration indication) state, the QCL source RS from a configured resource set; and
      to adjust uplink transmit timing for an uplink transmission based on the timing advance parameter for the TAG of the UE, the timing advance parameter being based on the QCL source RS indicated by the uplink TCI state.

18. The apparatus of claim 17, in which the QCL source reference signal comprises an SRS (sounding reference signal) of a configured SRS resource set, and in which the at least one processor is further configured to set the timing advance parameter by setting the timing advance parameter to match a timing advance of the SRS resource set.

19. The apparatus of claim 17, in which the at least one processor is further configured to set the timing advance parameter by calculating a beam specific timing advance, in which the QCL source reference signal comprises a downlink reference signal including a TRS (tracking reference signal), SSB (synchronization signal block) or a CSI-RS (channel state information reference signal).

20. The apparatus of claim 17, in which the at least one processor is further configured to adjust uplink transmit timing for a plurality of uplink beams, each uplink beam having its own uplink TCI state.

21. The apparatus of claim 17, in which the at least one processor is further configured to indicate a maximum number of sub-timing advance groups (TAGs) supported by the UE.

22. The apparatus of claim 17, in which the at least one processor is further configured:
  to set the timing advance parameter by measuring the source reference signal indicated by the uplink TCI state; and
  to adjust by adjusting all uplink beams with a single timing adjustment based on the measuring of the source reference signal.

23. An apparatus of a base station for wireless communication, comprising:
  memory, and
  at least one processor operatively coupled to the memory, the memory and the at least one processor configured:
    to set a timing advance parameter for a timing advance group (TAG) of a user equipment (UE) based on a quasi-collocated (QCL) source reference signal (RS) indicated by an uplink TCI (transmission configuration indication) state, the QCL source RS from a configured resource set; and
    to adjust uplink transmit timing for an uplink transmission based on the timing advance parameter for the TAG of the UE, the timing advance parameter being based on the QCL source RS indicated by the uplink TCI state.

24. The apparatus of claim 23, in which the at least one processor is configured to receive an indication, from the UE, of a maximum number of sub-timing advance groups (TAGs) supported by the UE, prior to setting the timing advance parameter.

25. The apparatus of claim 23, in which the at least one processor is configured to transmit an indication of a number of sub-timing advance groups (TAGs) to support.

26. The apparatus of claim 23, in which the at least one processor is configured to transmit a timing advance command including at least one sub-timing advance group (TAG) index, each sub-TAG comprising at least one uplink TCI state.

27. The apparatus of claim 23, in which the at least one processor is configured to transmit a media access control-control element (MAC-CE) comprising a plurality of sub-timing advance group (TAG) updates.

28. A UE (user equipment) for wireless communication, comprising:
  means for setting a timing advance parameter for a timing advance group (TAG) of the UE based on a quasi-collocated (QCL) source reference signal (RS) indicated by an uplink TCI (transmission configuration indication) state, the QCL source RS from a configured resource set; and
  means for adjusting uplink transmit timing for an uplink transmission based on the timing advance parameter for the TAG of the UE, the timing advance parameter being based on the QCL source RS indicated by the uplink TCI state.

* * * * *